United States Patent [19]

Aaron et al.

[11] Patent Number: 5,685,966

[45] Date of Patent: Nov. 11, 1997

[54] BUBBLE CAPTURE ELECTRODE CONFIGURATION

[75] Inventors: Arnold M. Aaron, Everett, Mass.; Stuart C. Dickinson, Bristol, R.I.

[73] Assignee: The United States of America as represented by the Secretary of the Navy, Washington, D.C.

[21] Appl. No.: 546,032

[22] Filed: Oct. 20, 1995

[51] Int. Cl.⁶ ............................................. H02K 44/00
[52] U.S. Cl. ........................... 204/600; 310/11; 417/50
[58] Field of Search ............................. 417/50; 310/11; 204/600

[56] References Cited

U.S. PATENT DOCUMENTS

| 4,764,908 | 8/1988 | Greer, Jr. | 367/178 |
| 4,767,953 | 8/1988 | Furuya et al. | 310/11 |
| 4,785,209 | 11/1988 | Sainsbury | 310/11 |

*Primary Examiner*—Arun S. Phasge
*Attorney, Agent, or Firm*—Michael J. McGowan; Michael F. Oglo; Prithvi C. Lall

[57] ABSTRACT

A bubble capture electrode configuration for an MHD system includes a body portion which forms a main channel and holds an electrically conductive fluid adapted to have a first flow direction. The system includes at least two electrodes wherein one is a cathode and the other is an anode. The electrodes are adjacent the body portion and are adapted to transmit an electric current therebetween and through the fluid. An electrolysis reaction is produced adjacent at least one electrode, forming gas bubbles. The system also includes magnetic poles for forming a magnetic field, wherein the magnetic field passes through the fluid substantially transverse to the electric current. Accordingly, a force is created for moving the fluid through the main channel. The system further includes a structure for preventing the gas bubbles from entering the main body portion and for preventing interference of the gas bubbles with the electric current flow, for increasing the efficiency of the system and decreasing interference with the electric current transmission through the conductive fluid.

20 Claims, 2 Drawing Sheets

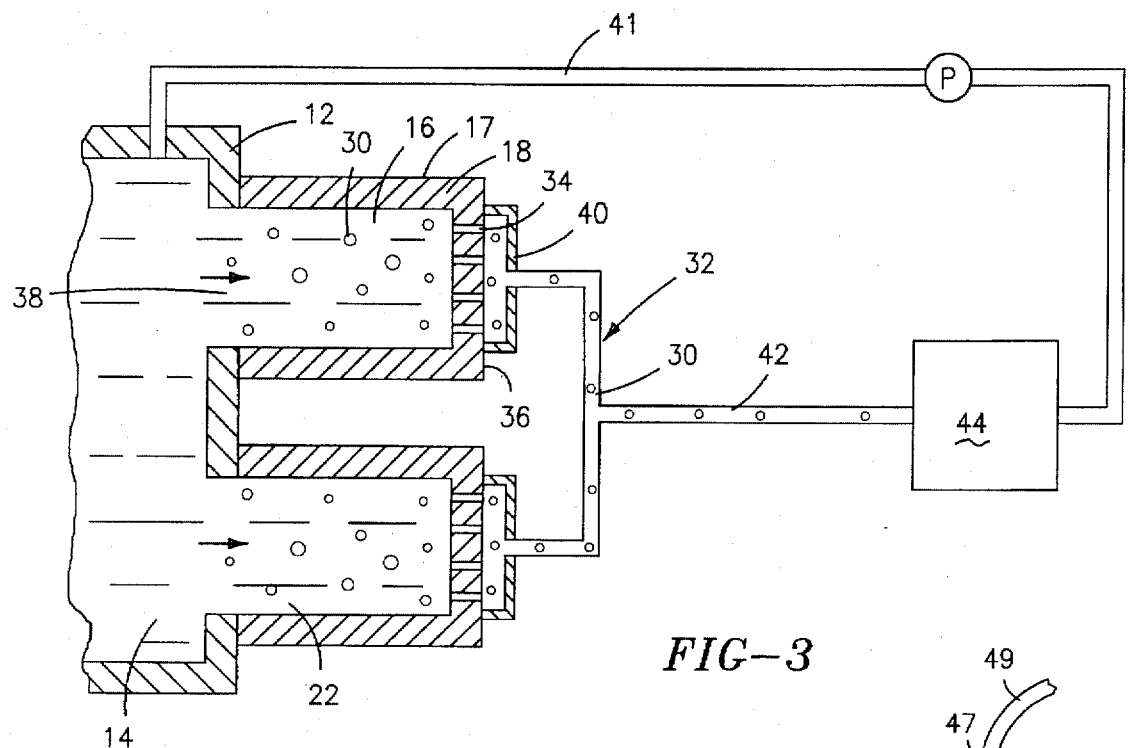
*FIG-3*
*FIG-3A*
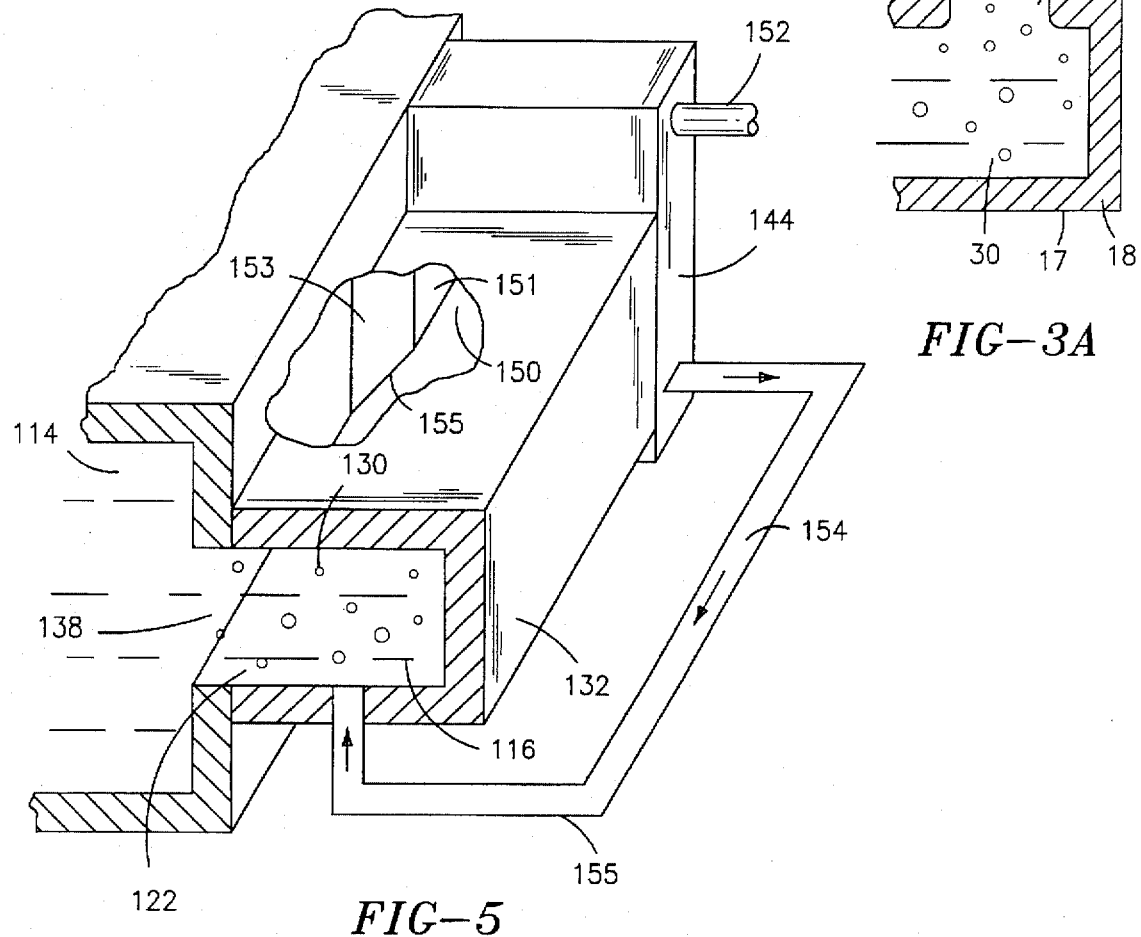
*FIG-5*

BUBBLE CAPTURE ELECTRODE CONFIGURATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to magnetohydrodynamic systems, and more particularly, to such a system having an electrode configuration for increasing system efficiency.

(2) Description of the Prior Art

Movement of an electrically conductive material through a transverse magnetic field and more specifically, the interaction of the moving conductive material with the magnetic field, results in the establishment of electrical voltage potentials in the conductive material. Devices based on this principle, in which a conductive fluid comprises the moving electrical conductive material, are generally referred to as magnetohydrodynamic (MHD) generators.

The interaction of an electric current passed through the electrically conductive fluid and a transversely directed magnetic field creates a force for moving the working fluid through a channel. As a result of using working fluids such as water, or seawater, the cathode and sometimes the anode electrodes producing the electric current create gas bubbles through an electrolysis reaction which interfere with the electric current, disrupt the flow in the MHD channel, and create acoustic noise interference. As a result, the efficiency of the MHD generator is adversely affected. Another efficiency interfering occurrence when using an MHD generator results from moving the fluid through and out of the main channel. Boundary layer separation and turbulence are produced at the boundaries of the fluid. Similar to acoustic noise, these forces reduce the efficiency of the MHD generator, thruster or pump.

Deficiencies which result from the actual design of the electrodes include, for example, the size of the electrodes being limited to the size of the walls of the MHD channel. This allows only for high current density on the surface of the electrode which can reduce the lives of the electrodes. Additionally, electrodes are typically designed for immersion in the main channel working fluid, which limits the selection of the electrolyte fluids to those having properties usable within the main channel. Frequently, fluid choices are limited by the particular application, such as, for example, seawater in underwater MHD systems. As a result, efficiency which could have been obtained by using different electrolytes adjacent the electrodes than those used in the main channel is unobtainable. The prior art includes devices related to MHD generators whose object is to reduce some of these adverse results which typically occur.

For increasing the efficiency of MHD generators, electrode surfaces have been designed to have greater surface area so as to create more potential and greater moving forces. For example, U.S. Pat. No. 3,311,762 discloses an electrode design directed toward increasing the surface area of contact of the electrodes with the moving fluid, i.e., a plasma. The electrode is shaped to allow more contact with the plasma to increase the capacity of the same to inject electrons therein. The shaped electrodes have surface grooves which extend nonparallel and preferably perpendicular to the direction of the magnetic field. As a result, the electrodes have larger areas for the exchange of electricity with the plasma; the electric charges exchanged per unit of time between the electrodes and the plasma are increased; and the intensity of the current supplied by the generator is increased. In a seawater application, efficiency is increased on one hand by increasing the surface area of electrodes, efficiency is also decreased, without remedy, due to the interference of gas bubbles formed from the electric current induced hydrolysis. Consequently, efficiency is not maximized.

Another example of an electrode having a particular shape for increasing MHD efficiency is disclosed in U.S. Pat. No. 4,315,169. This patent discloses an electrode having a wall configuration for protecting the electrodes from damage which can potentially result from arcing and chemical attack. The configuration includes electrode walls having periodic conductor/insulator elements arranged in a stepwise fashion for creating channel divergence or convergence. The electrode is arranged such that the walls converge in the direction of flow so as not to be pointedly exposed to hot gas flow. In addition, a turbulent recirculation area is formed adjacent the corners formed by the converging and stepwise nature of the electrodes. The resulting turbulence acts to move the arc spot formed by the current flow over the converging surfaces of the electrodes so as to prevent severe local damage from pitting. Chemical attack is inhibited by the surface of the electrode being laminated by a low corrosive material. The turbulence caused by the configuration of the electrode also assists in cooling the electrode surfaces. This patent is directed toward extending the life of the electrode; however, efficiency is lost via the creation of gas bubbles which interact with the electric current and cause interference.

Devices have been designed for collecting gases resulting from electrolysis type reactions while using MHD generators. For example, U.S. Pat. No. 4,465,964 discloses an energy conversion system, which uses a liquid flow loop wherein the liquid is initially moved therethrough via the establishment of a weight differential between the columns comprising the loop. Electricity is generated via a generator placed in the loop, wherein the electricity is used to electrolyze a second fluid into gases via an MHD process. The gases are regenerated and used to increase the rate of flow of the fluid and consequently the rate of electric energy production. Additional gases are gathered from the system for any number of uses. Among the possible uses for the gases are burning, heat and/or power production, and for use in synthesizing other fuels. While this patent discloses a device for capturing gases produced by the electrolysis process, the gases are not separated from the main flow path of the fluid and thereby system efficiency is still lost due to interference of the gas with the current flow. U.S. Pat. No. 4,643,809 discloses another system using an MHD type generator wherein a gas is collected from the resulting electrolysis reaction. Again, the gas bubbles are not separated from the main flow path of the fluid, thereby decreasing the efficiency of the system.

Another additional electrode configuration is described in U.S. Pat. No. 4,767,953, wherein the electrodes forming the anode and cathode of an MHD generation system are formed from hydrophobic carriers. The hydrophobic carriers are electrically conductive, gas permeable, and liquid impermeable. As a result, gases generated from the electrode during an electrolysis reaction is discharged from the rear surface of the electrode to the outside without releasing the gas into the electrically conductive fluid. While this system functions to alleviate interference with electrical current in the electrically conductive fluid, the design of the hydrophobic carrier electrodes is such that their size is limited by the size of the main channel of an MHD system. Size limitations increase current density on the electrode surface and decrease the lives of the electrodes. Also, the configuration maintains the electrodes in contact with the fluid in the main channel. As a result separate electrolytes can not be used for the electrode area for increasing system efficiency.

The prior art also includes systems for use with MHD generators which function to alleviate boundary layer turbulence caused by fluid flow for increasing the efficiency of electrical potential production. In U.S. Pat. No. 5,273,465, a boundary layer control system is disclosed which comprises a plurality of magnets and electrodes placed in circumferential rows adjacent the inside surface of a hull of a torpedo, missile or the like. The magnets are positioned so that the Lorentz force generated by the interacting magnetic and electrical fields will drive the boundary layer flow in an axial direction toward the aft end of the hull. The system reduces turbulence and may relaminarize boundary layer flow for reducing radiated noise. An additional boundary layer control system is shown in U.S. Pat. No. 3,851,195 which includes a complex arrangement of computer controlled, movable MHD generator walls which change positions, as load changes, for decreasing boundary layer turbulence. In addition, suction is employed to prevent boundary layer flow separation. Both of these patents disclose complex arrangements having special applications which tend to be uneconomical for more generalized MHD uses.

There exists a need, therefore, for a magnetohydrodynamic system having features for improving the efficiency of the system, for example, for the reduction of acoustic noise, as well as facilitating low current density on the electrode surface and allowing the use of two distinct conductive fluids.

SUMMARY OF THE INVENTION

The primary object of the present invention is to provide a magnetohydrodynamic (MHD) system which minimizes interference and maximizes efficiency.

Another object of this invention is to provide an MHD system which has structural features designed for reducing interference such as acoustic noise.

Still another object of this invention is to provide an MHD system which prevents the commingling of gas bubbles with fluid in the main fluid channel for the purpose of preventing acoustic noise interference.

Yet another object of this invention is to provide an MHD system which is structurally separated into a main fluid channel and auxiliary channels, wherein electrolysis reactions take place.

The foregoing objects are attained by the inventive bubble capture electrode configuration for use with MHD systems of the present invention which includes a body portion which forms a main channel and holds an electrically conductive fluid having a first flow direction. The system also includes at least two electrodes wherein one is a cathode and the other is an anode. The electrodes are positioned adjacent the body portion and are adapted to transmit an electric current therebetween and through the fluid. This produces an electrolysis reaction which creates gas bubbles adjacent at least one of the electrodes. The system also includes a means for forming a magnetic field wherein the magnetic field passes through the fluid substantially transverse to the electric current, creating a force for moving the fluid through the main channel. The system further includes means for preventing the gas bubbles from entering the main body portion and for preventing interference of the gas bubbles with the electric current. The means for preventing increases the efficiency of the system and decreases acoustic noise interference.

In one embodiment of the invention, the means for preventing includes at least one auxiliary channel having at least one inlet positioned adjacent and leading into the main channel. The auxiliary channel includes at least one of the electrodes wherein the gas bubbles from an electrolysis reaction are formed. The auxiliary channel further includes means for removing substantially all of the gas bubbles therefrom before the gas bubbles can enter the main channel. The same embodiment may further include at least one vent in the auxiliary channel, wherein the means for removing is a fluid removal system incorporating pressure differentiation for pulling the conductive fluid along with the gas bubbles through the vent(s) and out of the auxiliary channel.

In an alternative embodiment, the auxiliary channel may include a fluid flow path which leads substantially away from the inlet into the main channel. The fluid flow path leads to at least one vent traversing the same at a position substantially removed from the inlet. In this embodiment, the means for removing includes a pumping means and a gas removal system wherein the pumping means is adapted to move fluid and gas bubbles through the flow path and into the gas removal system.

Another embodiment may include the auxiliary channel having means positioned adjacent the inlet into the main channel for supplementing the prevention of the gas bubbles moving into the main channel. The supplemental means for prevention preferably comprises a gas impermeable membrane. In another embodiment, the membrane may also be impermeable to certain fluids for allowing the use of different conductive fluids in the main and auxiliary channels.

The details of the present invention are set out in the following description and drawings wherein like reference characters depict like elements.

BRIEF DESCRIPTION OF THE DRAWINGS

FIGS. 3 and 3A are an elevational and cross-sectional enlarged view of the electrodes and a fluid removal system;

FIG. 5 is an elevational and cross-sectional view of an alternative embodiment of the fluid removal system;

DETAILED DESCRIPTION OF THE PREFERRED EMBODIMENT

Figure 1:
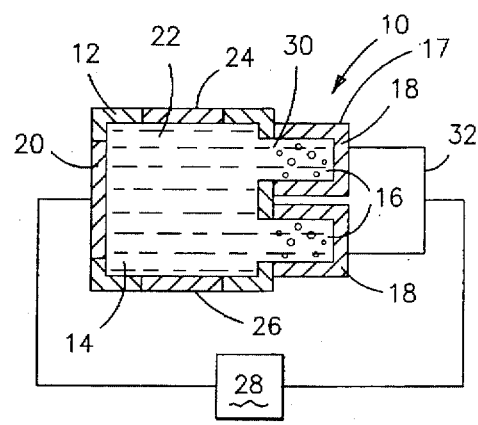
FIG. 1 is an elevational and cross-sectional view of an electrode configuration for a magnetohydrodynamic (MHD) system in accordance with the principles of the present invention.

Referring now to the drawings in detail, there is shown in FIG. 1, an elevational view of a magnetohydrodynamic (MHD) system in accordance with the present invention having an electrode configuration for increasing system efficiency, designated generally as 10. System 10 includes a body portion 12 forming a main channel 14, auxiliary channels 16 formed by shaped body portions 17, each of which include a cathode 18, and anode 20.

The body portion 12 forms a main channel 14 through which an electrically conductive working fluid 22 is adapted to flow in a first flow direction. Adjacent an upper wall of body portion 12, a north magnetic pole 24 is positioned. Adjacent a bottom wall of body portion 12, a south magnetic pole 26 is positioned. The two magnetic poles are used to create a magnetic field (not shown) within main channel 14 and through fluid 22. A power supply 28 transmits electric power to the cathodes 18 and anode 20. An electric current is transmitted from the cathodes 18 to the anode 20 through fluid 22 substantially transverse to the interacting magnetic field, which interaction results in a force for moving the fluid 22 through main channel 14.

In this embodiment, system 10 is designed for use in seawater applications, wherein fluid 22 is the seawater. Anode 20 may be formed from a standard anode material such as Titanium DSA from Eltech, Inc. Chlorine is the principal component of the electrolysis which occurs at the anode 20. The chlorine reacts quickly with the seawater forming chlorine compounds which are dissolved in the seawater. Thus, there is little gas production at the anode.

Cathode 18 is also formed from Titanium DSA. On the cathode side, a substantial amount of hydrogen gas is produced via the electrolysis reaction in quantities sufficient to deteriorate the performance of the system, if the gas is allowed to enter main channel 14. However, auxiliary channels 16 formed by shaped body portions 17 and the fluid extraction system 32 associated therewith, shown best in FIG. 3, isolates the gas bubbles to prevent substantial interference of the hydrogen gas with electric current transmissions.

Figure 2:
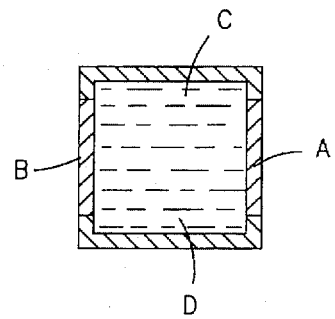
FIG. 2 is an elevational and cross-sectional view of a prior art electrode configuration for an MHD system.

The prior art shown in FIG. 2 has electrodes A and B immediately adjacent conductive fluid C in main channel D. In the present invention, shaped body portions 17 including cathodes 18 are physically distinct and separate from main channel 14. Auxiliary channels 16 act as a buffer between the hydrogen gas production at cathodes 18 and the main channel 14. In accordance with the present invention, gas bubbles 30 formed at the cathodes are trapped and removed via the fluid extraction system 32 shown in FIG. 3 before they can enter the main channel 14.

As shown in FIG. 3, shaped body portions 17 include vents 34 along a surface 36 opposed to or remote from the inlets 38 leading into the main channel 14. Vents 34 lead into manifolds 40 which are connected to a gas removal system 44 by tubing 42. Gas removal system 44 may be in the form of a conventional system, such as, for example, a gas scrubber system. To remove the gas bubbles formed adjacent the cathodes so as to prevent entrance of the bubbles into the main channel, a pressure differential is formed wherein a low pressure is produced, preferably via a pump P, in manifolds 40 relative to the pressure in auxiliary channel 16. This causes fluid 22 to flow out of the auxiliary channels 16 along with the gas bubbles 30. As a result, gas bubbles 30 are removed from auxiliary channel 16 before they can flow into main channel 14. In this configuration, inlets 38 are unobstructed, thereby allowing fluid 22 to flow from main channel 14 into auxiliary channel 16, as represented by the arrows, sweeping bubbles 30 therewith and into fluid extraction system 32.

As an alternative to the vent arrangement as shown in FIG. 3, the arrangement in FIG. 3A can be used. Accordingly, instead of placing vents 34 at the end of shaped body portion 17, gravity is used for removing the bubbles from the top of body portion 17. That is, shaped body portion 17 includes a protruding portion 45 extending from the top wall of body portion 17 into which fluid 22 flows. The protruding portion is preferably dome shaped forming a pocket 47 for trapping gas which rises via bubbles 30 by the force of gravity. Gas is then removed from pocket 47 of protruding portion 17 via the application of suction through tube 49.

In the main embodiment, once the fluid 22 with the gas bubbles 30 therein are in manifolds 40 and tubing 42, they are directed to the gas removal system 44 for the removal of bubbles 30 from fluid 22. Once the bubbles 30 are removed from fluid 22, the fluid is directed via piping 41 back into main channel 14.

Figure 4:
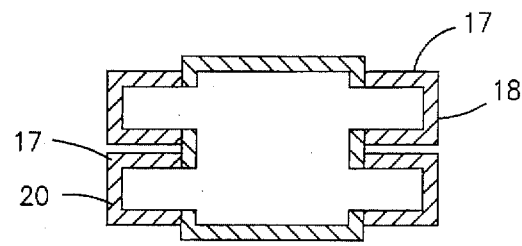
FIG. 4 is an elevational and cross-sectional view of an alternative embodiment of an electrode configuration in accordance with the principles of the present invention.

While system 10 has been shown as having two auxiliary channels 16, each formed by a shaped body portion 17, and two cathodes 18, system 10 can include any number of cathode and auxiliary channel arrangements.

Where fluid 22 is fresh water, there will be gas production at both the anode and the cathode. FIG. 4 illustrates a system to be used with fresh water. In this system, the shaped body portion 17, electrode arrangement and gas removal system shown in FIG. 3 are used for the anode 20 as well as the cathode 18. Such a system is needed because hydrogen is typically produced at the cathode and oxygen is typically produced at the anode, requiring therefore, auxiliary channels and respective electrodes on each side to remove the gas bubbles which are created. As discussed previously for the cathode side, any number of anode and auxiliary channel arrangements can be used as may be necessary.

Referring now to FIG. 5, an alternative to fluid extraction system 32 is shown as fluid extraction system 132. In this embodiment, auxiliary channel 116 is designed to extend away from inlet 138, forming an extended flow path 150. A wall 151 closes off a portion of extended flow path 150 from main channel 114. End 153 of wall 151 is hydrodynamically shaped, having, an inwardly extending angle 155, so as to reduce turbulence disturbances with the main channel as fluid 122 flows through flow path 150. Extended flow path 150 communicates with a gas removal system 144, wherein gas bubbles 130 can be removed from fluid 122. In this embodiment, fluid 122 is pumped along the fluid flow path 150 via a pump which forms part of the gas removal system. Gas is removed from fluid 122 by the system 144 via piping 152 while the electrolyte fluid 154 is returned to the auxiliary channel 130 via piping 155 for reuse. As such, a fluid circuit is formed.

Figure 6:
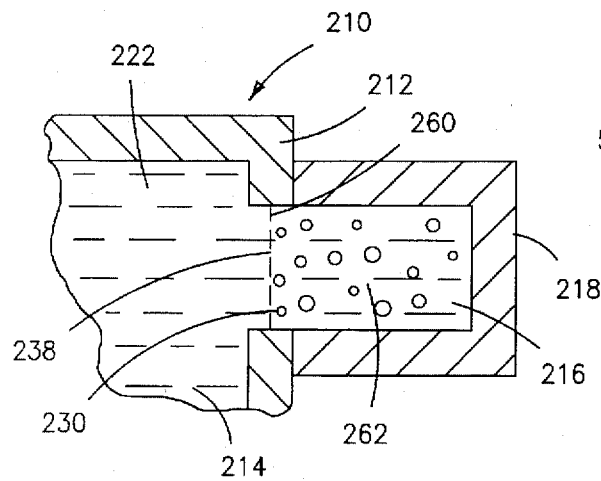
FIG. 6 is an alternative embodiment of the prevent invention showing a membrane positioned between the auxiliary and main channels.

FIG. 6 shows another embodiment of the present invention, designated as 210. Inlet 238 includes a gas impermeable membrane 260 positioned therein between auxiliary channel 216 and main channel 214. Membrane 260 is securely attached to the walls of body portion 212 forming inlet 238. Membrane 260 is preferably formed from "CELLOPHANE" or "GORTEX", and in this embodiment is impermeable to gas bubbles 230. The membrane allows the passage of conductive fluid or electrolyte 222 between main channel 214 and auxiliary channel 216 while stopping the passage of bubbles 230 from auxiliary channel 216 into main channel 214. The gas impermeable membrane 260 functions to supplement and enhance the efficiency of the bubble capture electrode configuration, for further preventing gas flow into main channel 214.

Referring still to FIG. 6, membrane 260 could also be of a material and design for being impermeable to electrically conductive fluids, for example, fluid 222. In this case, membrane 260 is also electrically conductive for allowing electrical current to move from the structurally separated cathode 218 into the fluid 222 in main channel 214 and the magnetic field. Such an arrangement allows the use of different electrically conductive fluids in auxiliary channel 216 and main channel 214. One embodiment could include the use of osmotic membranes used in standard chemical and water processing applications. Auxiliary channels 216 could include a fluid or auxiliary electrolyte 262 having increased conductivity for reducing loses by ohmic heating or could also have properties which would control the production of electrolysis products. A potential use for such an arrangement would be for a seawater thruster where the main channel has seawater as the working fluid and the auxiliary channel is filled with a solution with increased salt content for obtaining greater conductivity.

Figure 7:
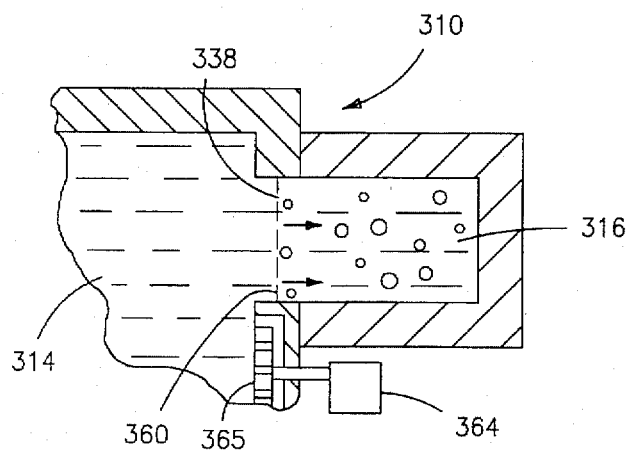
FIG. 7 is similar to FIG. 6 showing another alternative embodiment of the present invention for preventing boundary layer turbulence.

FIG. 7 shows another embodiment of the system of this invention designated as 310, wherein boundary layer turbulence is controlled along the walls of main channel 314 for increasing system efficiency. The boundary layer control feature of this embodiment can be used with any of the embodiments discussed above such as, for example, near the leading edge of wall 153 in the embodiment shown in FIG. 5, whereat a thin boundary layer would form. In this embodiment, a pump or vacuum source 364 is used to direct forced air or the like or suction, respectively, adjacent the boundary layers of fluid flow into auxiliary channel 316 for reducing localized turbulence. Suction or forced air is preferably directed through a perforated wall section 365 so as to enter the main flow along wall section 365 through the perforations. As a result, local drag reduction is produced downstream of inlet 338, which may also have a membrane 360 therein, for reducing the turbulent wall pressure fluctuations on walls downstream and for potentially reducing the acoustic noise of the device.

Figure 8:
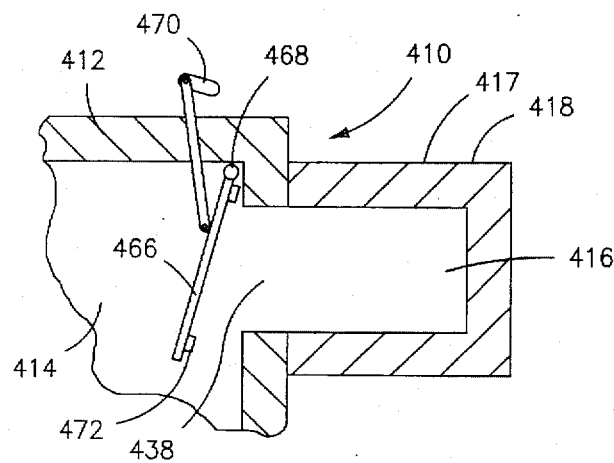
FIG. 8 is a cross-sectional and elevational view of another alternative embodiment of the present invention using a hinged door for separating the main cavity from the auxiliary cavity.

FIG. 8 shows another embodiment of this invention, designated as 410, wherein a hinged shutter door 466 is used for allowing inlet 438 to be closed. Such closing allows maintenance of the shaped body portions 417 and electrodes 418, without fluid interference. Door 466 operates with a hinge mechanism 468 attached thereto and to the inner wall of body portion 412, adjacent inlet 438. Door 466 also includes a closing means 470, such as a crank arm mechanism or the like, which is accessible from the outside of body portion 412. Seals 472 are positioned on door 466 in alignment with the peripheral walls of inlet 438. The seals and door allow main channel 414 to be sealed off from auxiliary channel 416. Auxiliary channel 416 can be pumped dry of conducting fluid or electrolyte and may be cleaned, maintained, or replaced without draining main channel 414. This feature has particular value for use in a ship propulsor located below the water line of the ship. Typically, the space surrounding the electrode, with this device, can be maintained dry for allowing maintenance without the services of underwater divers.

Figure 9:
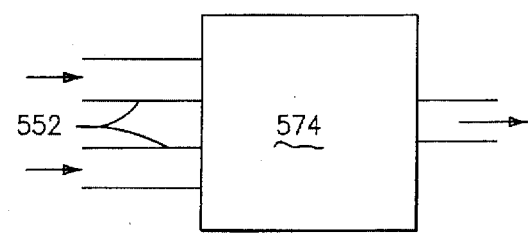
FIG. 9 is a schematic view of an energy conversion unit for use with the system of the present invention.

Each of the above embodiments of the inventive device disclosed herein can be used with a gas recycler 574, shown in FIG. 9. Gas bubbles, such as those indicated by 130 in FIG. 5, separated from a conductive fluid, as shown in FIG. 5 as 122 or auxiliary fluid, as shown in FIG. 6 as 262, produced from the electrolysis reactions at either the anode or cathode electrodes or both, are directed via a gas removal system, such as that shown in FIG. 5 as 144, via piping 552 to recycler 574. This is indicated in FIG. 9 via the arrows entering recycler 574. Recycler 574 reacts to gases from the anode or cathode or both and produces energy which can be converted to a useful form. The energy is moved to other apparatuses or the like for use, as indicated by the arrow exiting recycler 574. The recycler can be a thermal device using an exothermic reaction, such as burning to produce heat which can be used directly or converted to another form. An example would be a steam cycle spinning an electric generator, for producing electric power. Another example would be to use the gas in a fuel cell wherein hydrogen and oxygen can be used to produce electricity. This subsystem would increase the efficiency of the MHD device by reconverting the gas byproducts to a useful form of energy.

The primary advantage of this invention is that an MHD system is provided which minimizes interference and maximizes efficiency. Another advantage of this invention is that an MHD system is provided which is structurally designed for reducing interference such as acoustic noise. Still another advantage of this invention is that an MHD system is provided which prevents the commingling of gas bubbles with fluid in the main fluid channel for the purpose of preventing acoustic noise interference with current transmission. Yet another advantage of this invention is that an MHD system is provided which is structurally designed for separating the main fluid channel from auxiliary channels, wherein electrolysis reactions take place.

It is apparent that there has been provided in accordance with this invention a bubble capture electrode configuration which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A magnetohydrodynamic system, comprising:

a main body portion forming a main channel, wherein the main channel holds an electrically conductive fluid adapted to flow therethrough;

at least one shaped body portion extension defining at least one auxiliary channel extending from the main channel and containing electrically conductive fluid;

at least two electrodes wherein one is a cathode and the other is an anode, the electrodes positioned substantially adjacent the body portion and adapted to transmit an electric current flow therebetween and through the fluid in the main channel, at least one electrode of the at least two electrodes interacting with the fluid and producing an electrolysis reaction which creates gas bubbles in the fluid substantially adjacent the at least one electrode, said at least one electrode being positioned within said at least one auxiliary channel;

means for forming a magnetic field which passes through the fluid in the main channel substantially transverse to the electric current flow and generates a force for moving the fluid through the main channel;

means for substantially preventing the gas bubbles produced substantially adjacent the at least one electrode from moving from the at least one auxiliary channel and into the main channel so as to substantially prevent interference by the gas bubbles with flow in the main channel.

2. The system according to claim 1, wherein the system contains a volume of the fluid, the main channel containing a substantial portion of the volume of the fluid and the at least one auxiliary channel containing another portion of the volume of fluid, the at least one auxiliary channel being adapted to prevent the at least one electrode from contacting the portion of the volume of fluid in the main channel.

3. The system according to claim 1, wherein the at least one auxiliary channel has an inlet positioned adjacent and leading into the main channel and wherein the shaped body portion extension includes the at least one electrode wherein the gas bubbles are formed in the auxiliary channel.

4. The system according to claim 3, wherein the means for preventing is positioned adjacent the shaped body portion extension and includes means for removing substantially all of the gas bubbles from the auxiliary channel before the gas bubbles can enter the main channel.

5. The system according to claim 4, wherein the at least one auxiliary channel is a structural extension of the main channel and the at least one electrode is the cathode.

6. The system according to claim 4, comprising a second shaped body portion which forms a second auxiliary channel in which gas bubbles are formed from an electrolysis reaction, the second auxiliary channel having an inlet positioned adjacent and leading into the main channel, wherein the second shaped body portion includes the anode and means for removing substantially all of the gas bubbles from the second auxiliary channel substantially before the gas bubbles enter the main channel.

7. The system according to claim 4, wherein the at least one shaped body portion includes at least one vent and the means for removing comprises a fluid extraction system incorporating pressure differentiation for moving the fluid along with the gas bubbles through the at least one vent and out of the at least one auxiliary channel.

8. The system according to claim 7, wherein the fluid extraction system further includes a manifold positioned adjacent the at least one vent wherein the manifold is connected with piping means for guiding the fluid and gas bubbles away from the at least one auxiliary channel.

9. The system according to claim 4, wherein the at least one shaped body portion includes at least one vent located in the uppermost surface of the shaped body portion, the means for removing comprising a gas removal system incorporating piping means positioned adjacent the at least one vent which receives the gas bubbles passing through the vents under gravitational forces.

10. The system according to claim 4, wherein the at least one shaped body portion includes a fluid flow path leading substantially away from the inlet wherein a wall having at least one vent traverses the fluid flow path at a position substantially away from the inlet, the means for removing comprising a pumping means and a gas removal system, wherein the pumping means is adapted to move the fluid and gas bubbles through the flow path and the at least one vent and into the gas removal system.

11. The system according to claim 10, wherein the at least one vent is positioned above the fluid, the gas removal system incorporating piping means is positioned adjacent the at least one vent which receives the gas bubbles passing through the vents via gravitational forces.

12. The system according to claim 2, further including means for stopping the gas bubbles from moving into the main channel.

13. The system according to claim 12, wherein:

said means for stopping comprises a membrane which is impermeable to the gas bubbles; and said membrane is positioned between the main channel and the at least one auxiliary channel.

14. The system according to claim 3, comprising:

each of said at least one auxiliary channel containing an auxiliary working fluid different than the working fluid in the main channel; and means positioned between the main channel and the at least one auxiliary channel for stopping the gas bubbles and auxiliary working fluid from moving into the main channel.

15. The system according to claim 14, wherein the means for stopping comprises a membrane which is impermeable to the gas bubbles and the auxiliary working fluid and is electrically conductive.

16. The system according to claim 3, further comprising means for controlling boundary layer turbulence caused by the flow of the working fluid.

17. The system according to claim 16, wherein the means for controlling comprises means for applying a vacuum adjacent the inlet.

18. The system according to claim 3, further comprising closure means positioned between the main channel and the at least one auxiliary channel for physically separating the auxiliary channel from the main channel to block flow of fluid between the auxiliary channel and main channel.

19. The system according to claim 18, wherein the closure means comprises a door hinged to the body portion and moving means for closing and opening the door.

20. The system according to claim 4, further including gas removal means in fluid communication with the means for removing and gas recycling means in fluid communication with the gas removal means for recycling the gas bubbles removed from the auxiliary channel.

* * * * *